United States Patent
Berezin et al.

(10) Patent No.: US 10,339,740 B2
(45) Date of Patent: Jul. 2, 2019

(54) ACCELERATION AND GRAVITY DATA BASED SYSTEM AND METHOD FOR CLASSIFYING PLACEMENT OF A MOBILE NETWORK DEVICE ON A PERSON

(71) Applicant: GM Global Technology Operations LLC, Detroit, MI (US)

(72) Inventors: Vyacheslav Berezin, Newmarket (CA); Michael J. Chappell, Oshawa (CA); Paul A. Donald, Courtice (CA); Noah Samuel Louis Segal, Ottawa (CA); Norman J. Weigert, Whitby (CA); Ramzi Abdelmoula, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/446,274

(22) Filed: Mar. 1, 2017

(65) Prior Publication Data

US 2018/0253918 A1 Sep. 6, 2018

(51) Int. Cl.
| | |
|---|---|
| *G06F 3/0346* | (2013.01) |
| *G06F 3/033* | (2013.01) |
| *G07C 9/00* | (2006.01) |
| *H04M 1/725* | (2006.01) |
| *G01P 1/07* | (2006.01) |

(52) U.S. Cl.
CPC ............ *G07C 9/00309* (2013.01); *G01P 1/07* (2013.01); *G06F 3/0346* (2013.01); *G07C 9/00896* (2013.01); *H04M 1/72569* (2013.01); *G06F 2200/1637* (2013.01); *G06F 2203/04105* (2013.01); *G07C 2009/00507* (2013.01); *G07C 2009/00769* (2013.01); *G07C 2209/63* (2013.01)

(58) Field of Classification Search
CPC ....... G01C 21/12; G01L 27/005; G06F 17/00; G06F 3/0346; G06F 2200/1637; G06F 2200/1636; G06F 2203/04105; G06F 3/016; G06Q 40/08; H04M 1/72569; H04M 2250/12; H04W 52/0254; G01P 1/07; G07C 2009/00507; G07C 2009/00769; G07C 9/00309; G07C 9/00896

See application file for complete search history.

(56) References Cited

U.S. PATENT DOCUMENTS

| | | | |
|---|---|---|---|
| 9,536,364 B2 | 1/2017 | Talty et al. | |
| 2013/0197681 A1* | 8/2013 | Alberth, Jr. | ............. G06F 1/163 700/94 |
| 2013/0253878 A1* | 9/2013 | Sato | ........................ G01C 21/12 702/141 |

(Continued)

*Primary Examiner* — Dionne Pendleton

(57) ABSTRACT

A system is provided including a data module, a classification module and a control module. The data module is configured to receive at least one of acceleration data and gravity data from an accelerometer or a mobile network device, where the acceleration data and the gravity data are indicative of accelerations experienced by the mobile network device. The classification module is configured to classify a location of the mobile network device on a person based on the at least one of the acceleration data and the gravity data and generate a location classification output. The control module is configured to perform an operation based on the location classification output.

16 Claims, 8 Drawing Sheets

(56) References Cited

U.S. PATENT DOCUMENTS

| | | | |
|---|---|---|---|
| 2014/0149145 A1* | 5/2014 | Peng | G06F 3/0346 |
| | | | 705/4 |
| 2014/0240091 A1 | 8/2014 | Talty et al. | |
| 2017/0171821 A1* | 6/2017 | Agrawal | H04W 52/0254 |
| 2017/0234756 A1* | 8/2017 | Youssef | G01L 27/005 |
| | | | 73/1.57 |
| 2018/0216371 A1* | 8/2018 | Patel | E05B 81/76 |

* cited by examiner

ACCELERATION AND GRAVITY DATA BASED SYSTEM AND METHOD FOR CLASSIFYING PLACEMENT OF A MOBILE NETWORK DEVICE ON A PERSON

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to passive entry and passive start (PEPS) systems with approach detection.

A traditional PEPS system of a vehicle can include a sensor that is used to detect signals transmitted from a key fob. In response to the transmitted signals, a body control module of the vehicle can perform certain vehicle functions, such as lock doors, open a trunk, open a hatch, start an engine, etc. As a couple of examples, a PEPS system may be a low frequency (LF)/radio frequency (RF) PEPS system, a Bluetooth® low energy (BLE) PEPS system, a Wi-Fi® based PEPS system or a combination thereof. As a couple of examples, in the LF/RF PEPS system, the signals transmitted from the key fob may be pulsed at 315 or 435 megahertz (MHz) and the signals transmitted from the vehicle to the key fob may be pulsed at 125 kilohertz (kHz). In the BLE PEPS system, the signals transmitted from the key fob are pulsed at 2.4 gigahertz (GHz).

SUMMARY

A system is provided including a data module, a classification module and a control module. The data module is configured to receive at least one of acceleration data and gravity data from an accelerometer or a mobile network device, where the acceleration data and the gravity data are indicative of accelerations experienced by the mobile network device. The classification module is configured to classify a location of the mobile network device on a person based on the at least one of the acceleration data and the gravity data and generate a location classification output. The control module is configured to perform an operation based on the location classification output.

In other features, a system is provided and includes a data module, an averaging module, a classification module, a grouping module and a passive entry and passive start module. The data module is configured to receive gravity data from a mobile network device, where the gravity data is indicative of accelerations due to gravity experienced by the mobile network device. The averaging module is configured to determine absolute values of the gravity data and average the absolute values, wherein each of the average absolute values is an average of a respective set of the absolute values. The classification module is configured to iteratively classify a location of the mobile network device on a person based on largest ones of the average values and generate a location classification outputs, where each of the location classification outputs corresponds to a respective set of the largest ones of the average values. The grouping module is configured to group the location classification outputs of the classification module and select one of the location classification outputs as a placement result. The passive entry and passive start module is configured to perform an operation in a vehicle based on the placement result.

In other features, a method of classifying a location of a mobile network device on a person is provided. The method includes: receiving at least one of acceleration data and gravity data from the mobile network device, where the at least one of acceleration data and gravity data is indicative of accelerations experienced by the mobile network device; and determining absolute values of the at least one of acceleration data and gravity data and average the absolute values, where each of the average absolute values is an average of a respective set of the absolute values. The method further includes: iteratively classifying a location of the mobile network device on a person based on largest ones of the average values and generate a location classification outputs, where each of the location classification outputs corresponds to a respective set of the largest ones of the average values; grouping the location classification outputs of the classification module and selecting one of the location classification outputs as a placement result; and performing an operation in a vehicle based on the placement result.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A BLE PEPS system may perform certain operations based on an estimated distance between a person and a vehicle. For example, a BLE PEPS system may unlock a door of the vehicle when the person is within a predetermined range of the vehicle. The distance between the person and the vehicle may be determined based on BLE signals transmitted from a mobile network device to the vehicle. Examples of mobile network devices are a key fob, a mobile phone, a tablet, a wearable device (e.g., a smart watch), a laptop computer, a portable media player, etc. As an example, the distance may be determined based on strengths of the received BLE signals.

BLE signals are subject to multipath reflection and interference and can be absorbed in a human body. Thus, strengths of the transmitted BLE signals are stronger when the mobile network device is located between the person and the vehicle than when the person is located between the mobile network device and the vehicle. As an example, a strength of a BLE signal transmitted from a mobile network device located in a back pocket of a person, which is 1 meter away from a vehicle, may be equal to a strength of a BLE signal transmitted from a mobile network device located in a hand of a person that is 10 meters away from the vehicle.

Examples set forth herein include location classification systems for classifying where on a person a mobile network device is located and/or how a person is carrying or holding the mobile network device. Each of the location classification systems classifies the location of a mobile network device as one of a predetermined number of classifications. As an example, the classifications indicate that the mobile network device is: in a front pocket, in a back pocket, in a hand of a person, on a wrist of a person, on a hat, in a backpack, in a clothing article, in a waste pack, in a front pant pocket, in a back pant pocket, in a front shirt pocket, and/or other location classification. A PEPS system then determines distances of the person from the vehicle and performs operational decisions based on the provided location classifications.

Figure 1:
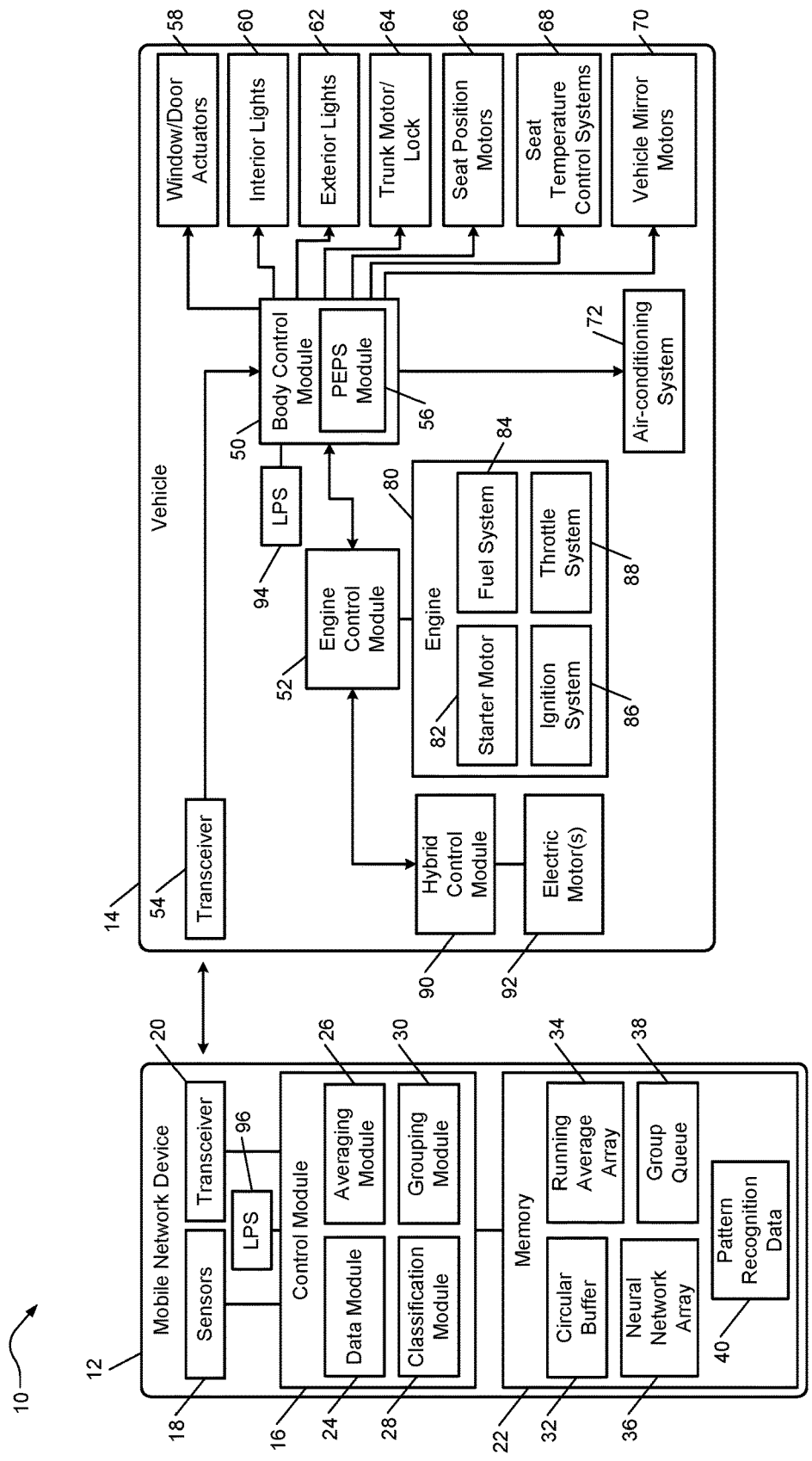
FIG. 1 is a functional block diagram illustrating an example of a location classification system in accordance with an embodiment of the present disclosure.

FIG. 1 shows a location classification system 10 that includes a mobile network device 12 and a vehicle 14. The mobile network device 12 may include a control module 16, sensors 18, one or more transceivers (a single transceiver 20 is shown), and a memory 22. The control module 16 includes a data module 24, an averaging module 26, a classification module 28 and a grouping module 30. The memory 22 includes a circular buffer 32, a running average array 34, a neural network array 36, and a group queue 38. The memory 22 may store pattern recognition data 40. The modules 24, 26, 28, 30, the circular buffer 32, the running average array 34, the neural network array 36, and the group queue 38 are described below with respect to the methods of FIGS. 2-3.

The sensors 18 include one or more accelerometers, which are used to collect acceleration data (e.g., linear acceleration data) and gravitational data. In one embodiment, a location classification process is performed based on the linear acceleration data and not the gravitational data. In another embodiment, a location classification process is performed based on the gravitational data and not the linear acceleration data. In yet another embodiment, a local classification process is performed based on both the linear acceleration data and the gravitational data.

An accelerometer is a gravity sensor. An accelerometer measures proper acceleration ("g-force"). Proper acceleration is not the same as coordinate acceleration (rate of change of velocity). For example, an accelerometer at rest on the surface of the earth measures an acceleration of $g=9.81$ meters per second squared ($m/s^2$) in a vertical direction. In contrast, an accelerometer in free fall orbiting and accelerating due to the gravity of the earth measures zero acceleration.

The sensors may be used to collect Cartesian coordinate data (X, Y, Z data) and/or polar coordinate data (distance from reference point and angle from reference direction data, i.e. two coordinates). In one embodiment, the Cartesian coordinate data is used and not the polar coordinate data. In another embodiment, the polar coordinate data is used and not the Cartesian coordinate data. In yet another embodiment, both the Cartesian and polar coordinate data is used. The polar coordinate data may be based on gravity data, which may include an earth or vehicle based reference coordinate and mobile network device coordinates.

The polar coordinate data is better suited for detecting pattern differences between (i) when the mobile network device 12 is located to experience a substantial amount of rotational changes in acceleration and (ii) when the mobile network device 12 is located to experience a minimal amount of rotational changes in acceleration. This is because the polar coordinate data directly indicates angular (or rotational) data, which is not readily available with Cartesian coordinate data. Rotational information may be indirectly determined from the Cartesian coordinate data. As an example, the mobile network device 12 when located in a pocket over a thigh or knee of a person would experience a substantial amount of rotational changes in acceleration. In contrast, the mobile network device 12 when located in a back pocket or in a back pack may experience a minimal amount of rotational changes in acceleration. Based on human kinematics and at least with respect to the mobile network device 12 being located in a front pocket versus a back pocket of a person, more acceleration information may be provided in the polar coordinate domain than in the Cartesian coordinate domain.

The transceivers including the transceiver 20 are wireless transceivers. In one embodiment, the transceiver 20 is a Bluetooth® transceiver. The transceivers may transmit and/or receive LF, RF, BLE and/or Wi-Fi® signals. The frequencies of the signals transmitted and received are suitable for: communicating with a body control module 50 of the vehicle; localization determination; and transmitting location classification data to the vehicle 14. Localization determination refers to determining distance between the mobile network device 12 and the vehicle 14. The distance may be determined based on signal strength, time of flight of transmitted signals, phase shift of the transmitted signals, etc.

The vehicle 14 includes a body control module 50, an engine control module 52, and one or more transceivers (a transceiver 54 is shown). The body control module 50 is in communication with the control module 16 of the mobile network device 12 via the transceivers. The body control module 50 includes a PEPS module 56, which controls operations of certain vehicle components, motors, and systems, such as window and door actuators 58, interior lights 60, exterior lights 62, a trunk motor and lock 64, seat position motors 66, seat temperature control systems 68 vehicle mirror motors 70 (e.g., side view motors and rear view motor), and air-conditioning system 72. The PEPS module 56 controls the components, motors, and systems based on location classification outputs provided by the control module 16. The location classification outputs indicate classifications of locations of the mobile network device 12 on a person. Example classifications are: in a front pocket, in a back pocket, in a hand of a person, on a wrist of a person, on a hat, in a backpack, in a clothing article, in a waste pack, in a front pant pocket, in a back pant pocket, in a front shirt pocket, and/or other location classification. Each location classification output may have a respective value corresponding to the location classification.

The engine control module 52 controls operation of an engine 80 of the vehicle 14. The engine 80 may include a starter motor 82, a fuel system 84, an ignition system 86 and a throttle system 88. The engine control module 52 may control operation of the starter motor 82, the fuel system 84, the ignition system 86 and the throttle system 88 based on signals from the PEPS module 56. The PEPS module 56 may, for example, signal the engine control module 52 to start and/or stop the engine 80 based on the location classification outputs received from the control module 16. The starting and stopping of the engine 80 may include: running the starter motor 82; enabling the fuel system 84 to start supplying fuel to the engine 80; disabling the fuel system 84 to stop supplying fuel to the engine 80; enabling the ignition system 86 to provide spark to cylinders of the engine 80; disabling spark to the cylinders of the engine 80; and adjusting position of a throttle of the throttle system 88.

The vehicle 14 may include a hybrid control module 90 that controls operation of one or more electric motors 92. The hybrid control module 90 may control operation of the motors 92 based on the location classification outputs received from the control module 16. This may include running and/or stopping the motors 92.

The transceivers including the transceiver 54 of the vehicle 14 are wireless transceivers. In one embodiment, the transceiver 54 is a Bluetooth® transceiver. The transceivers may transmit and/or receive LF, RF, BLE, and/or Wi-Fi® signals. The frequencies of the signals transmitted and received are suitable for: communicating with the control module 16 of the mobile network device 12; localization determination; and receiving location classification data from the mobile network device 12.

Figure 2:
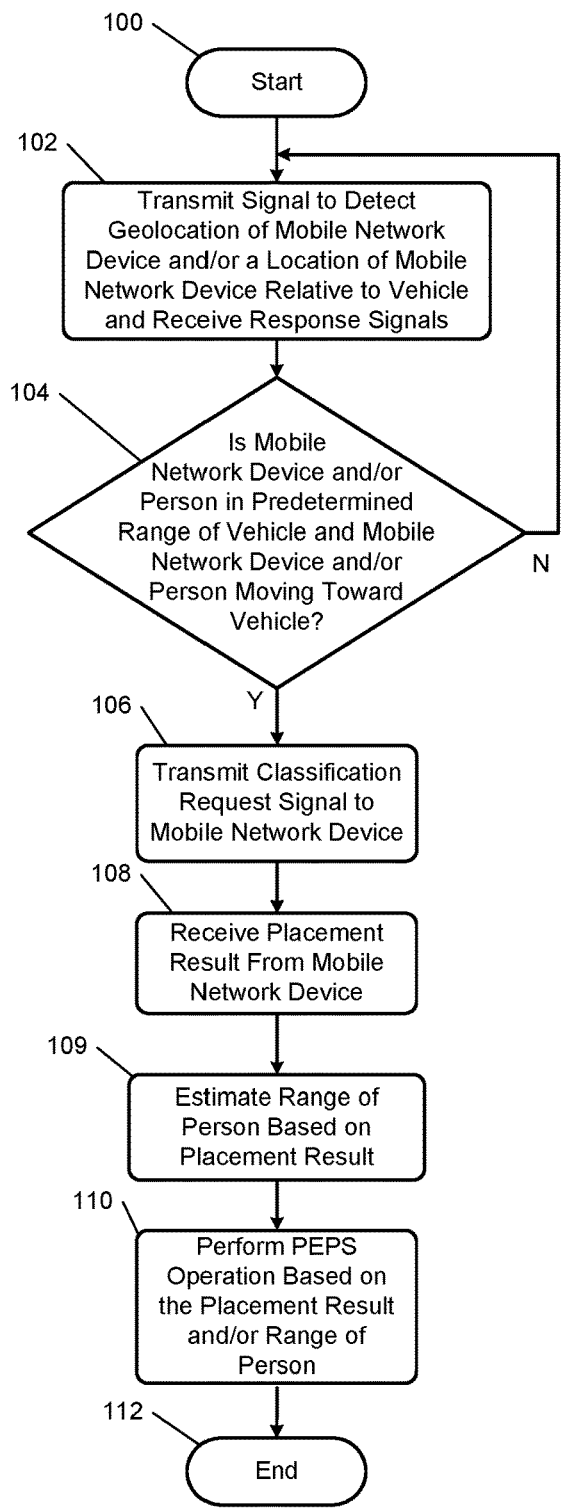
FIG. 2 illustrates an example of a PEPS operation method that is based on location classifications in accordance with the embodiment of FIG. 1.
Figure 3:
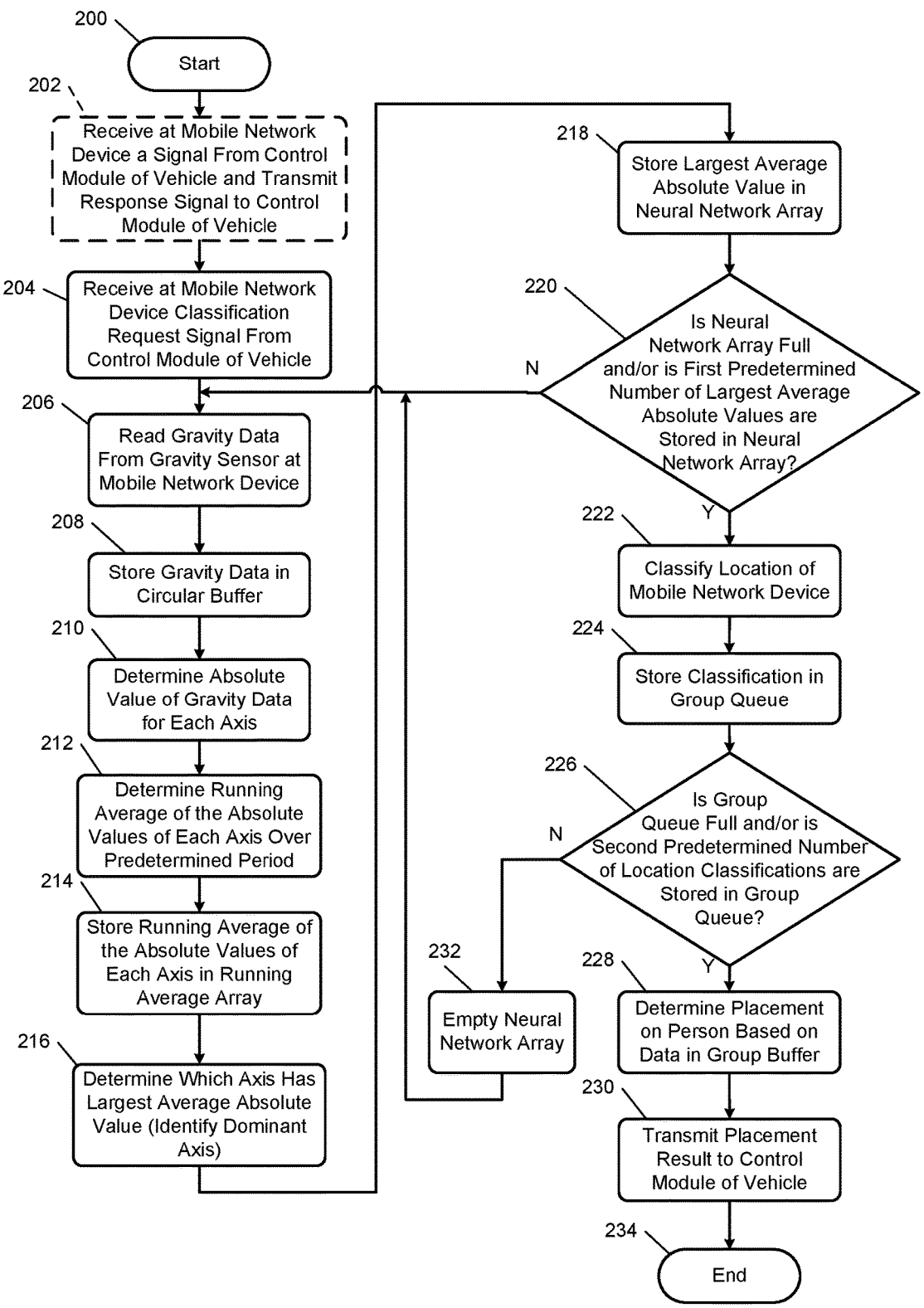
FIG. 3 illustrates an example of a location classification method implemented on a mobile network device in accordance with the embodiment of FIG. 1.

For further defined structure of the modules of FIG. 1 see below provided methods of FIGS. 2-3 and 4-5 and below provided definition for the term "module". The systems disclosed herein may be operated using numerous methods, example methods are illustrated in FIGS. 2-3 and 5-6. The methods of FIGS. 2-3 and 5-6 may be performed while a person is standing still, walking, jogging, running, moving towards and/or away from a vehicle. Data may be collected and processed to provide location classification results in a few seconds or less, depending on processing power, as to be performed in "real time". In FIGS. 2-3, a PEPS operation method implemented in a vehicle and a location classification method implemented on a mobile network device are shown.

Although for certain embodiments example portions FIGS. 2-3 and 5-6 are described with respect to use of a neural network, other machine learning algorithms may be used for determining location classifications and placement results. Also, although the methods of FIGS. 2-3 and 5-6 are directed to collecting data for systems that have been previously trained, the methods may be modified to collect data for training purposes. In one embodiment, data is collected to train a neural network. Data may be collected in a same or similar manner as collected for a trained system. Weight values of the neural network may be adjusted during the training process.

The method of FIG. 2 may be performed while the method of FIG. 3 is performed. Although the following operations are primarily described with respect to the implementations of FIGS. 1-3, the operations may be modified to apply to other implementations of the present disclosure. The operations may be iteratively performed.

The method of FIG. 2 may begin at 100. At 102, the PEPS module 56 may transmit a signal (e.g., an advertising signal) to detect a geolocation of the mobile network device 12 and/or a location of the mobile network device 12 relative to the vehicle 14. As an example, the PEPS module 56 may transmit signals to and receive signals from the mobile network device 12. The PEPS module 56 may, based on strengths of the signals received, estimate distances (i) between the mobile network device 12 and the vehicle 14 and/or (ii) between a person carrying the mobile network device 12 and the vehicle 14. As another example, the PEPS module 56 may communicate with one or more local positioning system (LPS) sensors/beacons located on the vehicle 14, on the mobile network device 12, and/or remotely from the vehicle 14 and mobile network device 12. Example LPS systems 94, 96 are shown. The PEPS module 56 may then receive response signals indicating locations of the mobile network device 12 and/or the vehicle 14 and estimate distances (i) between the mobile network device 12 and the vehicle 14 and/or (ii) between a person carrying the mobile network device 12 and the vehicle 14.

At 104, the PEPS module 56 may determine whether the mobile network device 12 and/or person is within a predetermined range of the vehicle 14 and whether the mobile network device 12 and/or person is moving towards the vehicle 14. These determinations are made based on the distance and location estimates determined at 102. If the mobile network device 12 and/or person is within the predetermined range and/or moving towards the vehicle 14, then task 106 is performed, otherwise task 102 may be performed.

At 106, the PEPS module 56 transmits a position classification request signal to the mobile network device 12 to initiate a location classification process. The position classification request signal requests for location classification outputs or placement result from one or more of the modules 16, 28, 30. In an embodiment, the placement result is requested from the grouping module 30. The placement result may be referred to as a location classification output or resultant location classification output. Operation 106 may be performed subsequent to operation 204 of FIG. 3. At 108, the PEPS module 56 receives the location classification outputs and/or placement result from one or more of the modules 15, 28 and/or 30. In an embodiment, the PEPS module 56 receives the placement result from the grouping module 30. The placement result indicates the location classification of the mobile network device 12, which may be determined based on location classification outputs from the classification module 28. Operation 108 may be performed subsequent to operations 230 of FIG. 3.

At 109, the PEPS module 56 may estimate a range of the person (i.e. a distance between the person and the vehicle 14), carrying the mobile network device 12, is from the vehicle 14. This estimation is based on the placement result. For example and for a same location of the person and when the person is facing the vehicle 14, the range between the person and the vehicle 14 is greater when the mobile network device 12 is located in a back pocket or in a back pack then when located in a front pocket or in a hand of the person. A distance may be estimated based on predetermined tabular data relating placement results to distances. The distance may be summed with or subtracted from a distance between the mobile network device 12 and the vehicle 14 to provide the estimated range. The distance between the mobile network device 12 and the vehicle may be estimated based on the distance determined at 104.

At 110, the PEPS module 56 performs PEPS operations based on the placement result and/or the range. For example, the PEPS module 56 may unlock doors when the person is within a predetermined range or lock doors when the person is outside the predetermined range. The method of FIG. 2 may end at 112.

The method of FIG. 3 may begin at 200. At 202, the control module 16 may receive a signal (e.g., the advertising signal) from the PEPS module 56 via the transceivers 20, 54 and transmit a response signal to the PEPS module 56. Operation 202 may be performed in response to operation 102 of FIG. 2.

Figure 7:
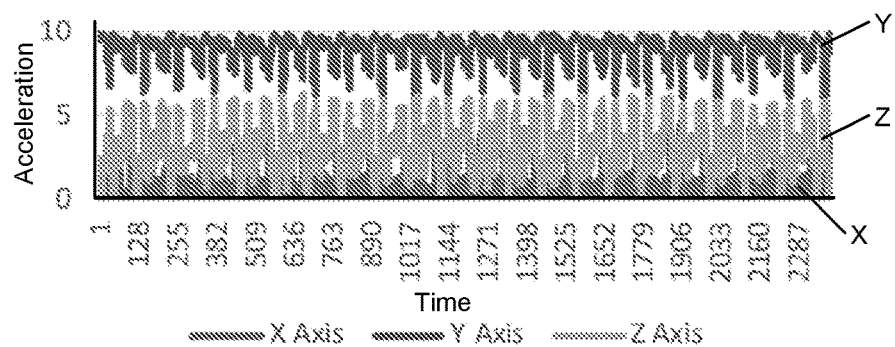
FIG. 7 is a graph of gravitational data illustrating an example of a pattern of coordinate data in accordance with an embodiment of the present disclosure.

At 204, the control module 16 may receive the classification request signal from the PEPS module 56. At 206, based on the classification request signal, the data module 24 may read acceleration data, gravity data from one or more of the sensors 18 and/or determine gravity data based on signals from one or more of the sensors 18. In one embodiment, this includes collecting any or all acceleration data from the sensors 18. The acceleration data may be represented as Cartesian and/or polar coordinate data. An example of gravity data collected while a person is walking and carrying a mobile network device is shown in FIG. 7. At 208, the data module 24 stores the gravity data in the circular buffer 32. In one embodiment, any or all of the acceleration data is stored in the circular buffer 32.

At 210, the averaging module 26 may determine absolute values of the acceleration and/or gravity data stored in the circular buffer 32. At 212, the averaging module 26 may determine a running average of the absolute values of the data stored in the circular buffer over the last predetermined period of time (e.g., 1 second). A running average may be determined for each axis when operating based on Cartesian coordinate data and/or for each dimension (distance r and angle φ dimensions) when operating based on polar coordinate data. At 214, the averaging module 26 stores the running averages of the absolute values for the axes and/or the dimensions in the running average array 34.

At 216, the averaging module 26 may determine for each set of running averages (e.g., running averages of X, Y, Z) the largest average absolute value. For example if the running average absolute value for the Y coordinate is larger than the running average absolute values for the X and Z coordinates than the running average absolute value for the Y coordinate is selected. The largest average absolute value is stored in the neural network array 36 at 218. The classification process is orientation and direction agnostic due to determining of the absolute values and selecting the largest ones of the absolute values. The largest average absolute values may be associated with a single axis or multiple axes. For the example of FIGS. 7-8, the Y axis has the largest average absolute values.

At 220, the classification module 28 may determine if the neural network array 36 is full and/or whether a first predetermined number of largest average absolute values are stored in the neural network array 36. For example, if 115 largest average absolute values are stored in the neural network array 36, then operation 222 is performed, otherwise operation 206 is performed. In an example embodiment, the 115 largest average absolute values are associated with 1.15 second of collected data and 1 walking step of the person, where each value is associated with 10.0 milliseconds of time. In another example embodiment, the 115 largest average absolute values are associated with 1 second of collected data and 1 walking step of the person, where each value is associated with 8.7 milliseconds of time. Operations 206-220 are performed until the neural network array 36 is full and/or the number of the largest average absolute values stored is equal to the first predetermined number.

Figure 9:
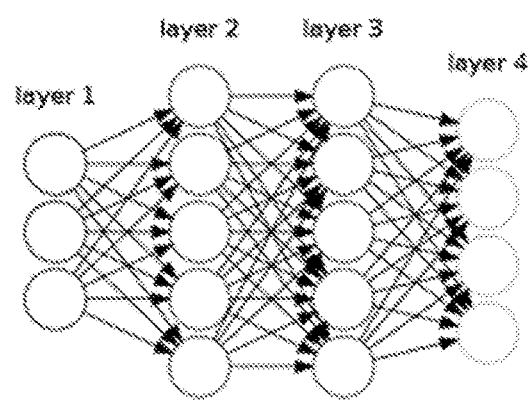
FIG. 9 is a diagram illustrating an example of a portion of a neural network in accordance with an embodiment of the present disclosure.

At 222, the classification module 28 classifies a current location of the mobile network device 12. This may include transferring the largest average absolute values from the neural network array 36 to the classification module 28. The classification module 28 may operate as a trained neural network having multiple layers. An example of a trained neural network is shown in FIG. 9 and may include layers. The layers may include an input (or first) layer, one or more hidden layers (e.g., layers 2, 3) and an output (or fourth) layer. The input layer may have as many inputs as values received from the neural network array 36 during operation 222. The output layer may include an output for each location classification. The largest average absolute values are provided to the first layer. Weights are applied as the values are transferred between the layers. Each arrow of FIG. 9 represents a weight being applied. For example, as each of the largest average values is transferred between the layers, the largest average absolute value is multiplied by a weight value. Each output the output layer receives and sums multiple values. The trained neural network is further described below. The output with the largest value is selected as the location classification, which is stored in the group queue 38 at 224.

As another example, the classification module 28 may access the pattern recognition data 40 and compare the acceleration data, gravity data, the running averages, the largest average absolute values, the Cartesian coordinate data, the polar coordinate data and/or portions thereof to the pattern recognition data 40. In one embodiment, amplitude changes in accelerometer data is compared to the pattern recognition data 40. The pattern recognition data 40 may include predetermined patterns corresponding to each location classification. The may include use of a pattern recognition algorithm to determine the predetermined pattern that best matches the data collected. The location classification associated with the best matching pattern is identified as the location classification, which may be stored in the group queue 38.

At 226, the grouping module 30 determines whether the group queue 38 is full and/or whether a second predetermined number (e.g., 5) of location classifications are stored in the group queue 38. If the group queue 38 is full and/or the second predetermined number of location classifications are stored, then operation 228 is performed, otherwise operation 232 is performed.

Figure 11:
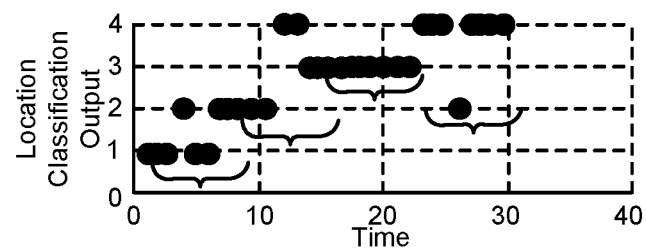
FIG. 11 is a plot of the location classification outputs of FIG. 10 illustrating example groupings in accordance with an embodiment of the present disclosure.

At 228, the grouping module 30 determines a placement result indicating placement of the mobile network device 12 on the person. In one embodiment, the last second predetermined number of location classifications stored in the group queue 38 is reviewed and the location classification indicated the most is selected as the placement result. For example, if 3 of 5 of the grouped values indicate a location classification of a front pocket, then the placement result is the front pocket. An example showing different groupings over time is shown in FIG. 11.

In another embodiment, the values stored in the group queue 38 are weighted, where the weights decrease with age of the value stored, such that the older values are weighted less than the currently stored values. The weighted group values for each location classification may be summed and the location classification having the largest summed value is selected as the placement result. In another embodiment, the weighted values are averaged and rounded to the nearest integer to indicate the placement result.

In yet another embodiment, an average of the values in the group queue 38 is determined and the average value rounded to the nearest integer indicates the placement result. Is still another embodiment, a combinational formula is used to determine the placement result.

At 230, the control module 16 transmits the placement result to the PEPS module 56 via the transceiver 20. At 232, the grouping module 30 empties the neural network array 36. Operation 206 may be performed subsequent to operation 232. The method of FIG. 3 may end at 234.

The above-described operations of FIGS. 2-3 are meant to be illustrative examples; the operations may be performed sequentially, synchronously, simultaneously, continuously, during overlapping time periods or in a different order depending upon the application. Also, any of the operations may not be performed or skipped depending on the implementation and/or sequence of events.

Figure 4:
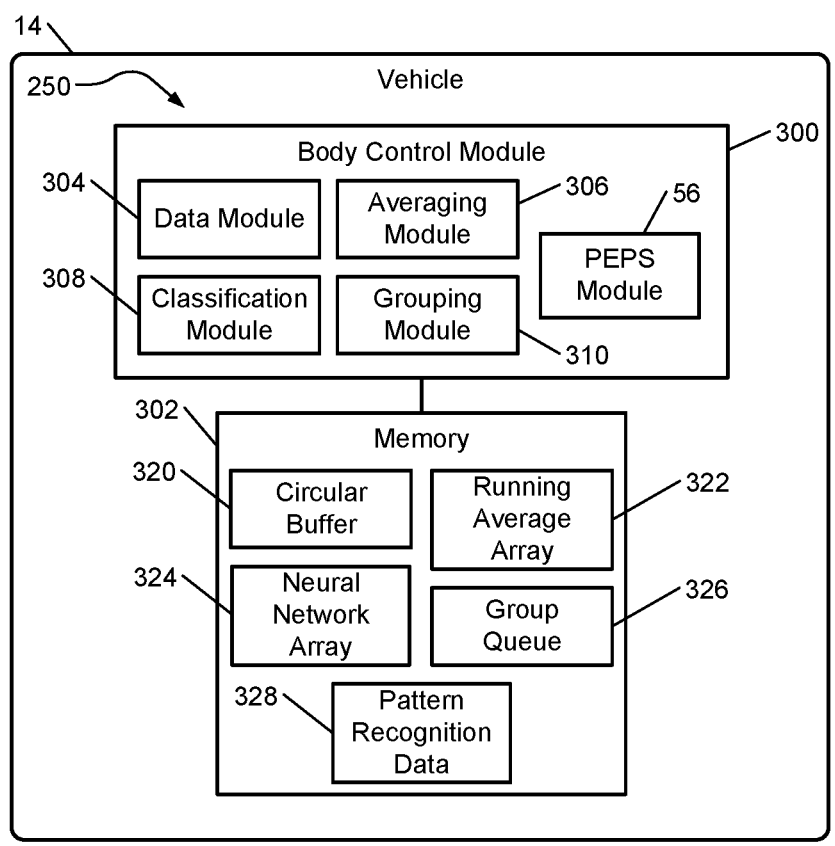
FIG. 4 is a functional block diagram illustrating an example of a portion of another location classification system implemented in a vehicle and in accordance with another embodiment of the present disclosure.

FIG. 4 shows a portion 250 of another location classification system implemented in a vehicle 14. The portion includes a body control module 300 and a memory 302. The body control module 300 may include a data module 304, an averaging module 306, a classification module 308 and a grouping module 310, which may operate similar as the modules 24, 26, 28 and 30 of FIG. 1. The body control module 300 may include the PEPS module 56 and may communicate with the mobile network device 12 of FIG. 1 or other mobile network device.

The memory 302 may include a circular buffer 320, a running average array 322, a neural network array 324, and a group queue 326 and may store pattern recognition data 328. The circular buffer 320, the running average array 322, the neural network array 324 and the group queue 326 may store data and values similar as the circular buffer 32, the running average array 34, the neural network array 36 and the group queue 38 of FIG. 1.

Figure 5:
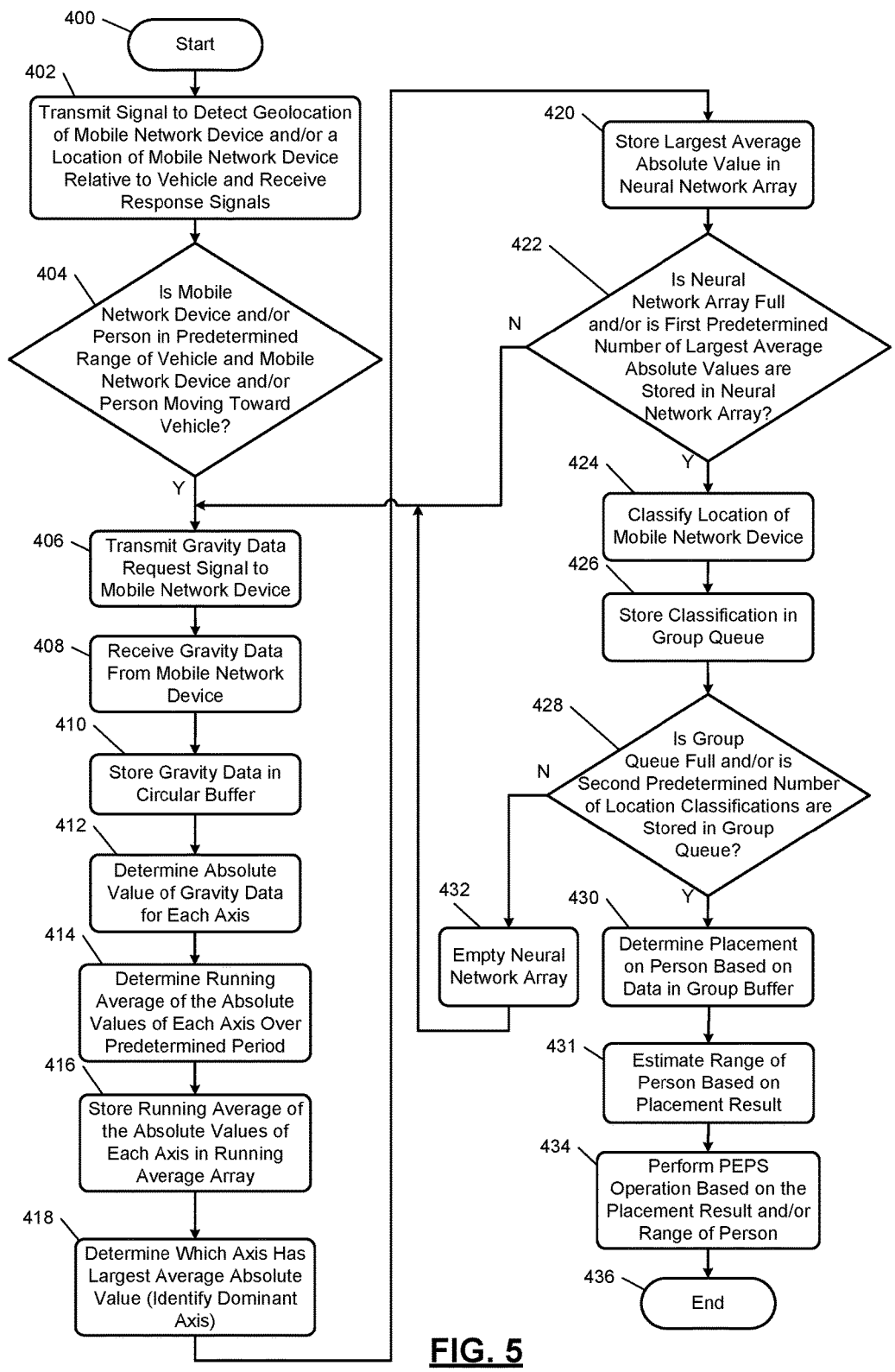
FIG. 5 illustrates an example of another PEPS operation method including a location classification method in accordance with the embodiment of FIG. 4.
Figure 6:
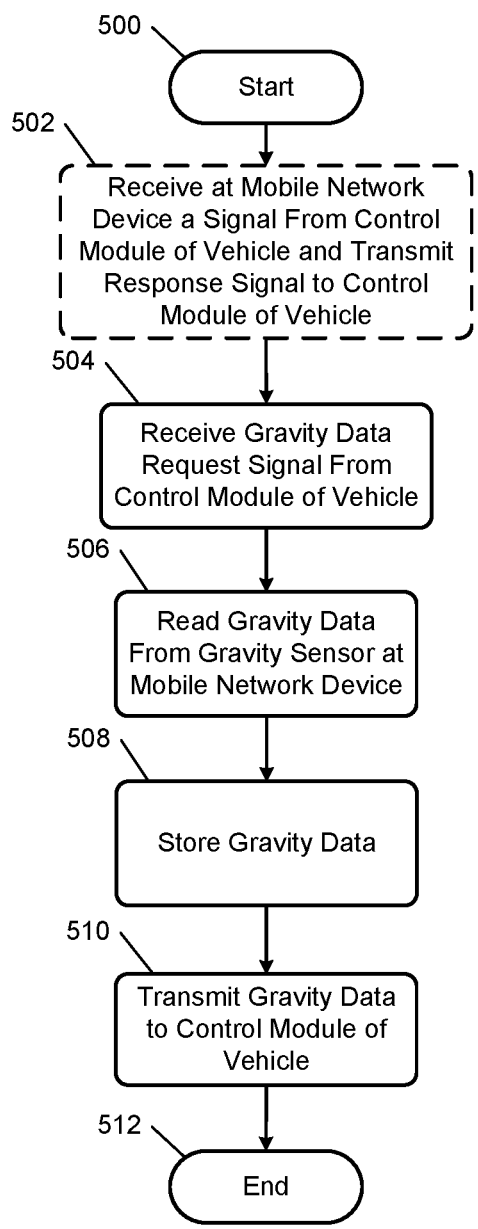
FIG. 6 illustrates an example of a gravity data collection method in accordance with the embodiment of FIG. 4.

In FIGS. 5-6, a PEPS operation method including a location classification method implemented on a mobile network device and a gravity data collection method are shown. The method of FIG. 5 may be performed while the method of FIG. 6 is performed. Although the following operations are primarily described with respect to the implementations of FIGS. 1 and 4-6, the operations may be modified to apply to other implementations of the present disclosure. The operations may be iteratively performed.

The method of FIG. 5 may begin at 400. At 402, the PEPS module 56 may transmit a signal (e.g., an advertising signal) to detect a geolocation of the mobile network device 12 and/or a location of the mobile network device 12 relative to the vehicle 14, as described above with respect to operation 102 of FIG. 2. At 404, the PEPS module 56 may determine whether the mobile network device 12 and/or person is within a predetermined range of the vehicle 14 and whether the mobile network device 12 and/or person is moving towards the vehicle 14. These determinations are made based on the distance and location estimates determined at 402. If the mobile network device 12 and/or person is within the predetermined range and/or moving towards the vehicle 14, then task 406 is performed, otherwise task 402 may be performed.

At 406, based on the classification request signal, the data module 304 may transmit a gravity data request signal to the control module 26 of the mobile network device 12. The gravity data request signal requests gravity data from the sensors 18 of the mobile network device 12. In another embodiment, the data module 304 and/or the body control module 300 may request acceleration data with or without the gravity data. At 408, the data module 304 receives the gravity data and/or other acceleration data from the mobile network device 12 and stores the data in the circular buffer 320 at 410.

At 412, the averaging module 306 may determine absolute values of the acceleration and/or gravity data stored in the circular buffer 320. At 414, the averaging module 306 may determine a running average of the absolute values of the data stored in the circular buffer over the last predetermined period of time (e.g., 1 second) as described above with respect to operation 212. At 416, the averaging module 306 stores the running averages of the absolute values for the axes and/or the dimensions in the running average array 322.

At 418, the averaging module 306 may determine for each set of running averages (e.g., running averages of X, Y, Z) the largest average absolute value as described above with respect to operation 216. The largest average absolute value is stored in the neural network array 324 at 420. The classification process is orientation and direction agnostic due to the determining of the absolute values and selecting the largest ones of the absolute values. The largest average absolute values may be associated with a single axis or multiple axes. For example, consecutive iterations of the operation 418 provide respective largest average absolute values. The largest average absolute values for the consecutive iterations may be for the same axis (e.g., the Y axis) or may be for different axes.

At 422, the classification module 308 may determine if the neural network array 324 is full and/or whether a first predetermined number of largest average absolute values are stored in the neural network array 324 as described above with respect to operation 220. Operations 406-422 are performed until the neural network array 324 is full and/or the number of the largest average absolute values stored is equal to the first predetermined number.

At 424, the classification module 308 classifies a current location of the mobile network device 12 as described above with respect to operation 222. This may include transferring the largest average absolute values from the neural network array 324 to the classification module 308. The classification module 28 may operate as a trained neural network having multiple layers. An example of a trained neural network is shown in FIG. 9 and may include layers. The output of the neural network with the largest value is selected as the location classification, which is stored in the group queue 326 at 426.

As another example, the classification module 308 may access the pattern recognition data 328 and compare the acceleration data, the gravity data, the running averages, the largest average absolute values, the Cartesian coordinate data, the polar coordinate data and/or portions thereof to the pattern recognition data 328. The pattern recognition data 328 may include predetermined patterns corresponding to each location classification. The predetermined pattern that best matches the data collected and/or determined is identified as the location classification, which may be stored in the group queue 326.

At 428, the grouping module 310 determines whether the group queue 326 is full and/or whether a second predetermined number (e.g., 5) of location classifications are stored in the group queue 326. If the group queue 326 is full and/or the second predetermined number of location classifications are stored, then operation 430 is performed, otherwise operation 432 is performed.

At 430, the grouping module 310 determines a placement result indicating placement of the mobile network device 12 on the person as described above with respect to operation 228 of FIG. 3.

At 431, the PEPS module 56 may estimate a range of the person, carrying the mobile network device 12, is from the vehicle 14. This estimation may be performed as described above with respect to operation 109 of FIG. 2.

At 432, the PEPS module 56 performs PEPS operations based on the placement result and/or the range. At 432, the grouping module 310 empties the neural network array 324. Operation 406 may be performed subsequent to operation 432. The method of FIG. 5 may end at 436.

The method of FIG. 6 may begin at 500. At 502, the control module 16 may receive a signal (e.g., the advertising signal) from the PEPS module 56 via the transceivers 20, 54 and transmit a response signal to the PEPS module 56. Operation 502 may be performed in response to operation 402 of FIG. 5.

At 504, the data module 24 receives a data request signal from the body control module 300 requesting gravity data and/or other acceleration data from the sensors 18. At 506, the data module 24 reads acceleration data including gravity data from one or more of the sensors 18 and/or determines gravity data based on signals from one or more of the sensors 18. In one embodiment, this includes collecting any or all acceleration data from the sensors 18. The acceleration data may be represented as Cartesian and/or polar coordinate data. An example of gravity data collected while a person is walking and carrying a mobile network device is shown in FIG. 7. At 508, the data module 24 stores the gravity data in the circular buffer 32. In one embodiment, any or all acceleration data is stored in the circular buffer 32. At 510, the data module 24 transmits the gravity and/or acceleration data to the data module 304. The method of FIG. 6 may end at 512.

The above-described operations of FIGS. 5-6 are meant to be illustrative examples; the operations may be performed sequentially, synchronously, simultaneously, continuously, during overlapping time periods or in a different order depending upon the application. Also, any of the operations may not be performed or skipped depending on the implementation and/or sequence of events.

Figure 8:
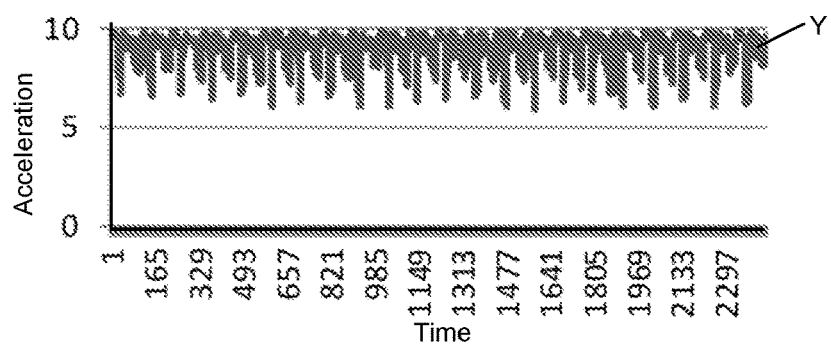
FIG. 8 is a graph of the gravitational data for one axis in accordance with the embodiment of FIG. 7.

FIG. 7 shows a graph of gravitational data illustrating an example of a pattern of Cartesian coordinate data (or X, Y, Z axis data). The gravitational data is for a person walking and holding a mobile network device is the person's hand. The Y-axis data has the largest absolute values for acceleration. FIG. 8 shows a graph of the gravitational data for only the Y-axis data, which may be selected using the methods of FIGS. 3 and 5.

FIG. 9 shows a diagram illustrating an example of a portion of a neural network. The neural network, as shown, includes 4 layers, but may include any number of layers. The first layer is the input layer, the second and third layers are hidden or intermediate layers, and the last layer is the output layer. Each layer has multiple nodes that receive values. The nodes of the first layer receive the selected largest average absolute values as described above. Although each of the layers is shown having a certain number of nodes, each layer may have any number of nodes. In one embodiment, each of the first, second and third layers include 115 nodes and the output layer includes 4 nodes. The second layer receives weighted amounts of the largest average absolute values.

Each node in the second layer may receive a value from all of the nodes in the first layer. Each node in the third layer may receive a value from each of the nodes in the second layer. Each node in the fourth layer may receive a value from each of the nodes in the third layer. Each node in the second, third, and fourth layers may sum the corresponding weighted values received.

Figure 10:
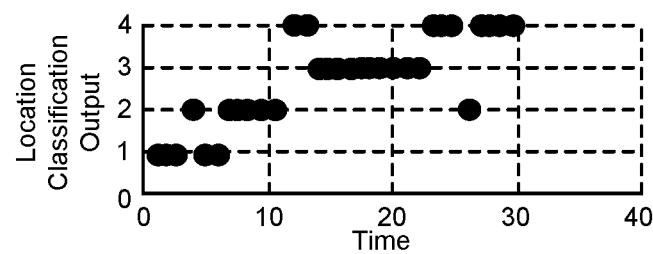
FIG. 10 is a plot of example location classification outputs of the neural network array of FIG. 9.

FIG. 10 shows a plot of example location classification outputs of a neural network array of FIG. 9. Each point in the plot refers to a location classification output. In the example shown there are four location classifications numbered 1-4. As an example, the numbers 1-4 may respectively refer to front pocket, back pocket, hand free, and in-hand classifications.

FIG. 11 shows a plot of the location classification outputs being grouped. The brackets are shown to illustrate which location classification outputs are in a group queue and/or grouped to determine a placement result. For example, the bracket may be effectively slid along the plot over time from left to right to select the latest group of location classification outputs. Each grouping may include location classification outputs associated with different location classifications. In the example shown, the location classification outputs located above a bracket are grouped for that corresponding period of time.

While the foregoing location classification systems are primarily described with respect to vehicle implementations, the location classification systems are applicable to non-vehicle implementations. For example, the location classification systems may be implemented for classifying mobile network device locations on a person in a warehouse or in an airport. Instead of portions of the location classification systems being located in a vehicle, the portions may be located in a computer and at, for example, a monitoring station. As an example, the local classification systems may be used to monitor locations of employees and/or aid employees in performing certain tasks. The local classifications obtained may be used to open and/or unlock doors of the warehouse and/or airport. The location classification systems may be used to monitor how mobile network devices are being carried and used and/or an amount of time of use. For example, if the mobile network device is being held in a hand of a person, the mobile network device is likely being used as opposed to when the mobile network device is in a pocket.

As a couple more examples, the vehicle 14 of FIGS. 1 and 4 may be replaced with a bicycle, an electric bicycle, a recreational trailer, or other object for which passive activation, passive start, and/or other passive operations are performed. The vehicle 14 may be replaced with a bicycle or recreational trailer that includes one or more of a control module, an engine, an electric motor, lights, etc. similar to the vehicle 14. The engine, electric motor, lights, etc. may be operated based on location classifications and/or placement results of a mobile network device on a person as described above. As another example, the vehicle 14 may be replaced with a residential home or business having doors that may be locked or unlocked in a similar manner described above. The home or business may include a control module and door locks, which are locked and unlocked based on location classifications and/or placement results of a mobile network device on a person as described above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a data module configured to receive at least one of acceleration data and gravity data from an accelerometer in a mobile network device, wherein the acceleration data and the gravity data are indicative of accelerations experienced by the mobile network device;
a classification module configured to
classify a location where the mobile network device is on a person based on the at least one of the acceleration data and the gravity data and generate a location classification output indicating where on the person the mobile network device is located relative to a first bodily feature of the person,
by determining whether the mobile network device is within one of a pocket, a backpack, a clothing article, and a waste pack;
wherein when the mobile network device is determined to be in a pocket, further determining whether the pocket is a front pocket, a front pant pocket; a back pant pocket or a front shirt pocket; and
classify the location as being at least one of the front pocket, the backpack, the clothing article, the waste pack, the front pant pocket, the back pant pocket or the front shirt pocket; and
a control module configured to perform an operation based on the location classification output.

2. The system of claim 1, further comprising:
an averaging module configured to determine absolute values of the gravity data and average the absolute values, wherein each average absolute value generated is an average of a respective plurality of the absolute values;
wherein the classification module is configured to iteratively classify the location of the mobile network device based on largest ones of the average absolute values and generate location classification outputs indicating where on the person the mobile network device is located relative to at least one bodily feature of the person, wherein each of the location classification outputs corresponds to a respective plurality of the largest ones of the average absolute values, and wherein the at least one bodily feature includes the first bodily feature;
a grouping module configured to group the location classification outputs of the classification module and select one of the location classification outputs as a placement result; and
wherein the control module is configured to perform an operation based on the placement result.

3. The system of claim 2, wherein the averaging module is configured to determine absolute values of the gravity data for each Cartesian coordinate and average the absolute values.

4. The system of claim 1, wherein the classification module is configured to classify the location of the mobile network device based on polar coordinates of the at least one of the acceleration data and the gravity data.

5. The system of claim 1, wherein:
the data module and the classification module are implemented in the mobile network device; and
the data module receives the at least one of the acceleration data and the gravity data from the accelerometer.

6. The system of claim 1, wherein:
the data module and the classification module are implemented in a vehicle; and
the data module is configured to wirelessly receive the at least one of the acceleration data and the gravity data via a transceiver from the mobile network device.

7. The system of claim 6, wherein:
the transceiver receives a Bluetooth® low energy signal from the mobile network device; and
the Bluetooth® low energy signal includes the at least one of the acceleration data and the gravity data.

8. The system of claim 6, wherein the control module in controlling the operation controls a component, a motor or a system of the vehicle based on the location classification output.

9. The system of claim 1, wherein the control module in performing the operation:
wirelessly transmits the location classification output to a vehicle; or
determines a placement result based on the location classification output and wirelessly transmits the placement result to the vehicle, wherein the placement result is a location classification determined based on the location classification output, and wherein the placement result indicates how the person is carrying or holding the mobile network device.

10. The system of claim 1, wherein the classification module classifies the location of the mobile network device on the person as at least one of in a pocket, in a hand of the person, or not in a hand of the person.

11. The system of claim 1, wherein the control module is configured to:
determine a distance between the mobile network device and a vehicle; and
perform the operation based on the distance and the location classification output.

12. The system of claim 11, wherein the control module is configured to, based on the distance and the location classification output, perform at least one of: lock a door of the vehicle; open a trunk of the vehicle; open a hatch of the vehicle; or start an engine of the vehicle.

13. The system of claim 1, wherein the control module is configured to perform a passive entry passive start operation based on the location classification output.

14. The system of claim 1, wherein the feature of the person is a hand, a back, an arm, a wrist, or a waste.

15. The system of claim 1, wherein the classification module is configured to:
determine whether the mobile network device is located on a front side or a back side of the person; and
classify the location based on the determination of whether the mobile network device is located on the front side or the back side of the person.

16. The system of claim 1, wherein:
the data module is configured to receive coordinate data relative to a reference point, wherein the coordinate data indicates the location on the person where the mobile network device is located; and
the classification module is configured to classify the location based on human kinematics, the coordinate data, and the at least one of the acceleration data and the gravity data.

* * * * *